US008839325B2

(12) United States Patent
Li et al.

(10) Patent No.: US 8,839,325 B2
(45) Date of Patent: Sep. 16, 2014

(54) SYSTEM AND METHOD OF MANAGING VIDEO CONTENT QUALITY

(75) Inventors: Zhi Li, San Ramon, CA (US); Canhui Ou, Danville, CA (US); Michael Tisiker, Westland, MI (US); Donggen Zhang, Fremont, CA (US); Xiaochuan Yi, Pleasanton, CA (US); Raghvendra Savoor, Walnut Creek, CA (US); Orestis Manthoulis, Sausalito, CA (US); Christine Bouamalay, Oakland, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1233 days.

(21) Appl. No.: 11/706,129

(22) Filed: Feb. 14, 2007

(65) Prior Publication Data

US 2008/0192119 A1     Aug. 14, 2008

(51) Int. Cl.
    *H04N 7/173*      (2011.01)
    *H04N 21/442*      (2011.01)
    *H04N 21/24*      (2011.01)
    *H04N 21/647*      (2011.01)
    *H04N 17/00*      (2006.01)

(52) U.S. Cl.
CPC ....... *H04N 17/004* (2013.01); *H04N 21/44209* (2013.01); *H04N 21/2402* (2013.01); *H04N 21/64723* (2013.01)
USPC .......................................................... 725/107

(58) Field of Classification Search
CPC ... H04N 20/12; H04N 21/24; H04N 21/2402; H04N 21/4424; H04N 17/04; H04B 17/0067
USPC ....................................................... 725/125
See application file for complete search history.

(56) References Cited

U.S. PATENT DOCUMENTS

| | | |
|---|---|---|
| 5,596,364 A | 1/1997 | Wolf et al. |
| 6,055,015 A | 4/2000 | Edwards |

(Continued)

FOREIGN PATENT DOCUMENTS

| | | | |
|---|---|---|---|
| WO | 2004072820 A2 | 8/2004 | |
| WO | WO 2006021702 A1 * | 3/2006 | .............. H04L 12/24 |

OTHER PUBLICATIONS

Marilly et al. (US 2007/0260911) is provided for english translation of Marilly (WO 2006/021702).*

(Continued)

*Primary Examiner* — Nathan Flynn
*Assistant Examiner* — Alfonso Castro
(74) *Attorney, Agent, or Firm* — Toler Law Group, PC (57) ABSTRACT

Disclosed is a system and method of managing video content quality. The method includes receiving performance data at a video quality prediction system where the performance data is related to a plurality of network elements of a network path linking a video-head end with a set-top box device. The method also includes predicting, based at least partially on the performance data, a quality of video content received at the set-top box device and determining whether the predicted quality of video content is greater than or equal to a video quality threshold. In addition, the method includes identifying at least one of the plurality of network elements not satisfying a performance requirement, based on the performance data, when the predicted quality of video content is less than the video quality threshold. Further, the method includes outputting data indicating the at least one network element not satisfying the performance requirement.

28 Claims, 6 Drawing Sheets

(56) References Cited

U.S. PATENT DOCUMENTS

| | | | |
|---|---|---|---|
| 6,411,623 B1 | 6/2002 | DeGollado et al. | |
| 2002/0116154 A1* | 8/2002 | Nowak et al. | 702/186 |
| 2002/0149675 A1 | 10/2002 | Abraham et al. | |
| 2003/0105604 A1 | 6/2003 | Ash et al. | |
| 2003/0126238 A1* | 7/2003 | Kohno et al. | 709/220 |
| 2003/0147386 A1* | 8/2003 | Zhang et al. | 370/390 |
| 2004/0114685 A1 | 6/2004 | Kouloheris et al. | |
| 2004/0190633 A1 | 9/2004 | Ali et al. | |
| 2004/0208133 A1 | 10/2004 | Jay et al. | |
| 2005/0123027 A1* | 6/2005 | Cioffi et al. | 375/222 |
| 2005/0220033 A1* | 10/2005 | DelRegno et al. | 370/249 |
| 2006/0142001 A1* | 6/2006 | Moisan et al. | 455/428 |
| 2006/0190594 A1* | 8/2006 | Jorgenson et al. | 709/224 |
| 2007/0004399 A1 | 1/2007 | Laiho et al. | |
| 2007/0260911 A1* | 11/2007 | Marilly et al. | 714/4 |
| 2007/0283401 A1* | 12/2007 | Lee et al. | 725/107 |
| 2008/0066113 A1* | 3/2008 | Skelly | 725/58 |
| 2008/0168520 A1* | 7/2008 | Vanderhoff et al. | 725/131 |

OTHER PUBLICATIONS

International Search Report and Written Opinion of the International Searching Authority for International Application No. PCT/US2008/000728, mailed Jan. 7, 2008.

* cited by examiner

SYSTEM AND METHOD OF MANAGING VIDEO CONTENT QUALITY

FIELD OF THE DISCLOSURE

The present disclosure relates generally to systems and methods of managing video content quality.

BACKGROUND

Networks used to deliver video content can have strict performance requirements. These performance requirements can be stricter than those relating to, for example, voice and data services. Nonetheless, the complex network structures used to deliver video content can present challenges for content providers to ensure that the video content provided to consumers meets an expected level of quality. These challenges can increase when content providers attempt to identify quality problems prior to customer complaints. Hence, there is a need for an improved system and method of managing video content quality.

DETAILED DESCRIPTION OF THE DRAWINGS

A video content quality prediction system is disclosed that includes a processor and logic accessible to the processor. The logic is adapted to receive performance data related to a plurality of network elements of a network path linking a video-head end with a set-top box device. The logic is also adapted to predict, based at least partially on the performance data, a quality of video content received at the set-top box device and to determine whether the predicted quality of video content is greater than or equal to a video quality threshold. In addition, the logic is adapted to identify at least one of the plurality of network elements not satisfying a performance requirement, based on the performance data, when the predicted quality of video content is less than the video quality threshold. Further, the logic is adapted to output data indicating the at least one network element not satisfying the performance requirement.

In another embodiment, a method of managing video content quality is disclosed that includes receiving performance data at a video quality prediction system. The performance data is related to a plurality of network elements of a network path linking a video head-end with a set-top box device. The method also includes predicting, based at least partially on the performance data, a quality of video content received at the set-top box device and determining whether the predicted quality of video content is greater than or equal to a video quality threshold. In addition, the method includes identifying at least one of the plurality of network elements not satisfying a performance requirement, based on the performance data, when the predicted quality of video content is less than the video quality threshold. Further, the method includes outputting data indicating the at least one network element not satisfying the performance requirement.

In another embodiment, a processor-readable medium is disclosed that includes instructions executable by a processor to receive performance data regarding a plurality of network elements of a network path linking a video-head end with a set-top box device. The processor-readable medium also includes instructions executable by the processor to predict, based at least partially on the performance data, a quality of video content received at the set-top box device and to determine whether the predicted quality of video content is greater than or equal to a video quality threshold. In addition, the processor-readable medium includes instructions executable by the processor to identify at least one of the plurality of network elements not satisfying a performance requirement, based on the performance data, when the predicted quality of video content is less than the video quality threshold. Further, the processor-readable medium includes instructions executable by the processor to output data indicating the at least one network element not satisfying the performance requirement.

Figure 1:
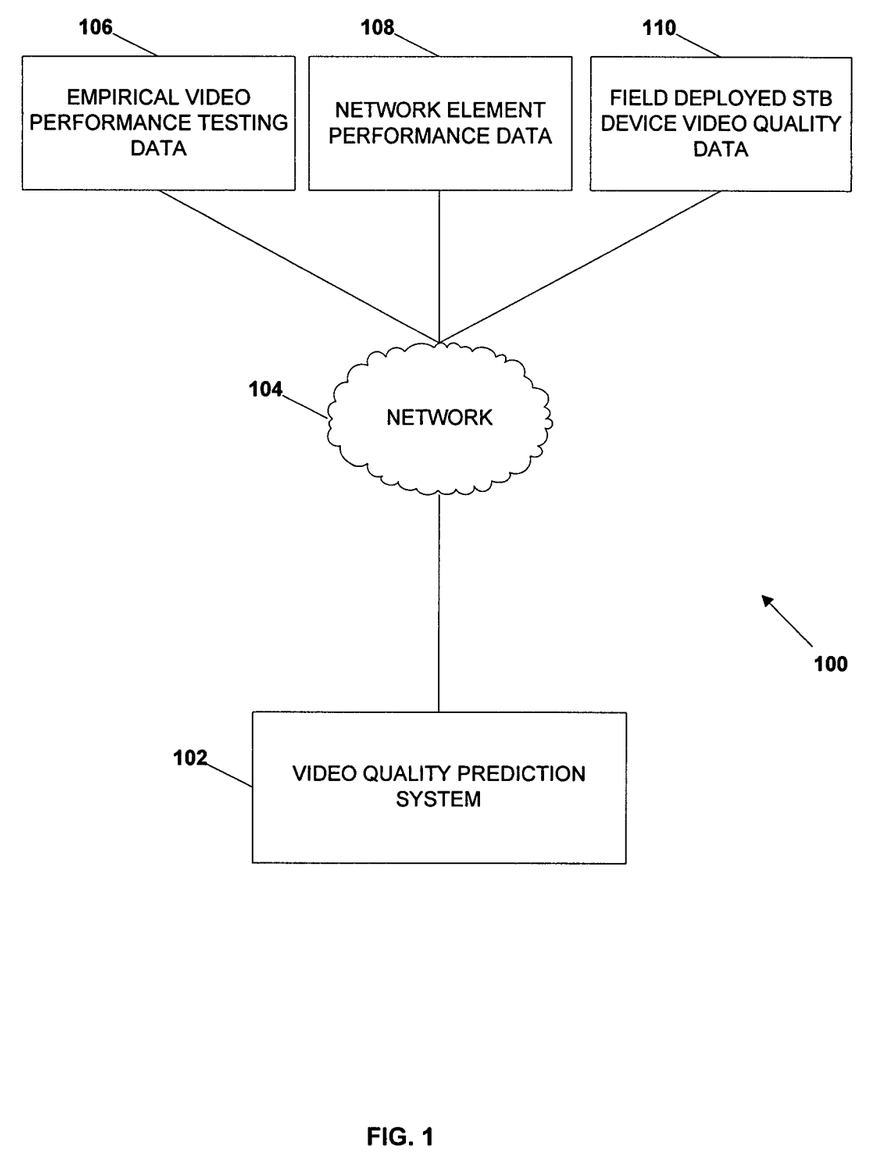
FIG. 1 is a block diagram illustrating an embodiment of a system to manage video content quality.

FIG. 1 is a block diagram illustrating an embodiment of a system 100 to manage video content quality. The system 100 includes a video quality prediction system 102 communicating with a network 104. In a particular embodiment, empirical video performance testing data 106 may be received at the video quality prediction system 102 via the network 104. In an illustrative embodiment, the empirical video performance testing data 106 may be generated by measuring the quality of video content generated under various network performance conditions. For example, the video performance quality may be assessed while varying the values of a plurality of network performance metrics, such as delay, jitter, packet loss ratio, packet loss distance, packet loss period, unrecovered packet loss, and dropped frames, such as intracoded frames (I-frames), bi-predictive frames (B-frames), or predictive coded frames (P-frames), or any combination thereof. In an illustrative, non-limiting embodiment, the empirical video performance testing data 106 may be stored at a video performance testing system and may be sent via the network 104 to the video quality prediction system 102. In a particular embodiment, the video quality prediction system 102 may develop a video quality model based on the received empirical video performance testing data 106. In an illustrative example, the video quality model can relate physical layer performance, for example, code violation, error seconds, and severe error seconds, to packet loss. The video quality model can then be applied to the amount of packet loss experienced at one or more set-top box devices to predict the quality of video content received at the set-top box devices via a plurality of network elements.

In a particular embodiment, network element performance data 108 may be received via the network 104 at the video quality prediction system 102. In a particular embodiment, the network element performance data 108 may relate to network elements located along a network path linking a video-head end with one or more set-top box devices. In an illustrative embodiment, the network element performance data 108 may be gathered by an element management system and may be sent by the element management system to the video quality prediction system 102. In another illustrative embodiment, the network element performance data 108 may be received by the video quality prediction system 102 directly from each network element of the network path. The network element performance data 108 may be used by the video quality prediction system 102, in conjunction with the video quality model derived from the empirical video performance testing data 106, to predict a quality of video content received at a set-top box device communicating with the video head-end via the network path.

In a particular embodiment, the video quality prediction system 102 may determine whether the predicted quality of video content is greater than or equal to a video quality threshold. If the predicted video quality is less than the video quality threshold, the video quality prediction system 102 may identify at least one of the plurality of network elements of the network path that are not satisfying a performance requirement, based on the performance data. For example, a network element experiencing buffer overflow due to packet latency or experiencing a specified amount of packet loss, may not be satisfying a performance requirement related to packet processing speed. In a particular embodiment, the video quality prediction system 102 may output data indicating the network element(s) not satisfying the performance requirement(s). In an illustrative, non-limiting embodiment, the output data may indicate a need to re-route video content around the network element(s) not satisfying the performance requirement(s).

In a particular embodiment, video quality data 110 is received at the video quality prediction system 102 from one or more field deployed set-top box devices via the network 104. In an illustrative embodiment, the field deployed set-top box device video quality data 110 may be used by the video quality prediction system 102 to adjust the video quality model developed using the empirical video performance testing data 106. In an illustrative, non-limiting embodiment, the field deployed set-top box device video quality data 110 may be assessments of video content quality reported by one or more field subscribers.

Figure 2:
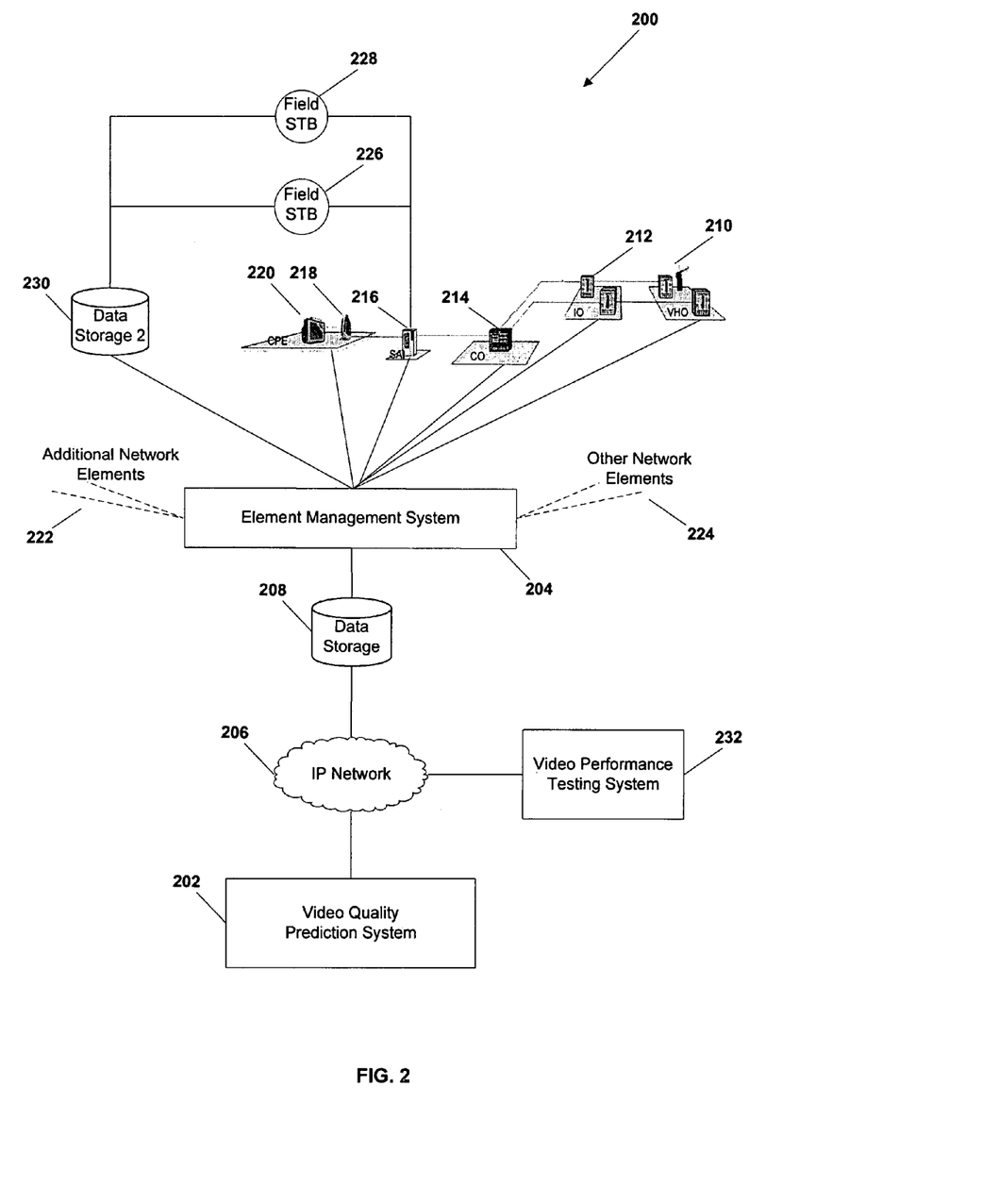
FIG. 2 is a block diagram illustrating a second particular illustrative embodiment of a system to manage video content quality.

FIG. 2 is a block diagram illustrating a second particular illustrative embodiment of a system 200 to manage video content quality. The system 200 includes a video quality prediction system 202 that communicates with an element management system 204 via an Internet Protocol (IP) network 206. In a particular illustrative embodiment, the element management system 204 may be coupled to a first data storage device 208. The first data storage device 208 may communicate with the video quality prediction system 202 via the IP network 206.

In a particular embodiment, the element management system 204 may receive performance data from a plurality of network elements 210-216 of a network path. In an illustrative embodiment, the network path may include devices at one or more video head-end offices 210. In an illustrative, non-limiting embodiment, the video head-end office(s) 210 may serve as a regional head-end office, a super head-end office, a national head-end office, or any combination thereof. In an illustrative embodiment, the video head-end office(s) 210 may communicate with devices at a central office 214 via an inter-nodal office 212. Further, the central office 214 may communicate with one or more customer premises equipment devices, such as a customer residential gateway 218, a customer set-top box device 220, or any combination thereof via a service area interface 216. In an illustrative, non-limiting embodiment, the network elements of the network path may be part of an Internet Protocol Television (IPTV) system.

Examples of devices at a video head-end office, central office, inter-nodal office, or service area interface may include switch devices, host devices, such as central office terminals, access devices, aggregation devices, IP switches, IP routers, multiplexers, other devices, or any combination thereof.

In an illustrative embodiment, element management system 204 may collect performance data related to additional network elements 222, such as one or more video distribution hubs, one or more network edge devices, one or more routers, one or more switches, a digital subscriber line access multiplexer (DSLAM), an optical network terminal, an optical line terminal, an optical network unit, a home phone line network adaptor, a very high-speed digital subscriber line (VDSL) loop, a fiber optic line, a home network phone line, or any combination thereof. The element management system may also collect performance data related to other network elements 224. In an illustrative, non-limiting embodiment, the performance data collected from the network elements may be stored at the first data storage device 208. In an alternative illustrative, non-limiting embodiment, the performance data collected from the network elements may be stored at an internal data store of the element management system 204.

Performance data can include service queue statistics from the network elements, such as packet drops and queue length; network element control plane warning information, such as internet group multicast protocol (IGMP) join and leave warnings, detected network link failures, and border gateway protocol (BGP)/open shortest path first (OSPF)/multi-protocol label switching (MPLS) re-converge events; network link length; distance between network elements; active probing performance results between network elements; very high-speed digital subscriber line (VDSL) performance counters from a digital subscriber line access multiplexer (DSLAM)/residential gateway; DSLAM/residential gateway warnings; optical line terminal performance counters and warnings; optical network terminal performance counters and warnings; home phone line network adaptor statistics and warnings; performance counters from the set-top box device; or any combination thereof.

In an illustrative, non-limiting embodiment, the network path can include one or more very high-speed digital subscriber line (VDSL) loops and the performance data can include code violation, error seconds, severe error seconds, or any combination thereof, related to the VDSL loop. In another illustrative, non-limiting embodiment, the network path can include an Ethernet layer and the performance data may include performance counters, such as Ethernet frame cyclic redundancy checks (CRCs), Ethernet frames dropped, or any combination thereof, related to the Ethernet layer.

In a particular embodiment, the system 200 may include the field deployed set-top box devices 226 and 228. In an illustrative embodiment, the field deployed set-top box devices 226 and 228 may be coupled to a second data storage device 230, and the second data storage device 230 may communicate with the video quality prediction system 202 via the element management system 204. In an alternative illustrative embodiment, the second data storage device 230 may communicate with the video quality prediction system 202 via the IP network 206. The second data storage device 230 may store video quality data received from the field deployed set-top box devices 226 and 228. In an illustrative embodiment, the field deployed set-top box devices 226 and 228 may be a part of the network path including one or more network elements 210-216. For example, the field deployed set-top box devices 226 and 228 may communicate with the serving area interface 216. In an alternative illustrative embodiment, the field deployed set-top box devices 226 and 228 may communicate directly with the element management system 204. In another alternative illustrative embodiment, the field deployed set-top box devices 226 and 228 may communicate directly with the video quality prediction system 202 via the IP network 206.

In a particular embodiment, the field deployed set-top box devices 226 and 228 may provide video quality data for use at the video quality prediction system 202. In an illustrative embodiment, the video quality data may be subjective measurements of video content quality that are entered by a field subscriber associated with a particular field deployed set-top box device 226 and 228. In an illustrative, non-limiting embodiment, the video quality data may be entered via a graphical user interface shown on a display coupled to the particular field deployed set-top box device. In another illustrative, non-limiting embodiment, the video quality data may be entered via a remote control device associated with the particular field deployed set-top box device 226 and 228.

In a particular embodiment, the system 200 may include a video performance testing system 232 communicating with the video quality prediction system 202 via the IP network 206. In an illustrative embodiment, the video quality prediction system 202 may receive empirical video performance testing data from the video performance testing system 232. In a particular embodiment, the video quality prediction system 202 may develop a video quality model based on the empirical video performance testing data. The video quality prediction system 202 may apply the video quality model to performance data related to the network elements 210-216 received from the element management system 204 to predict a quality of video content received at a set-top box device of the network path, such as the set-top box device 220. Further, the video quality prediction system 202 may adjust the video quality model based on the video quality data received from the field deployed set-top box devices 226 and 228.

Figure 3:
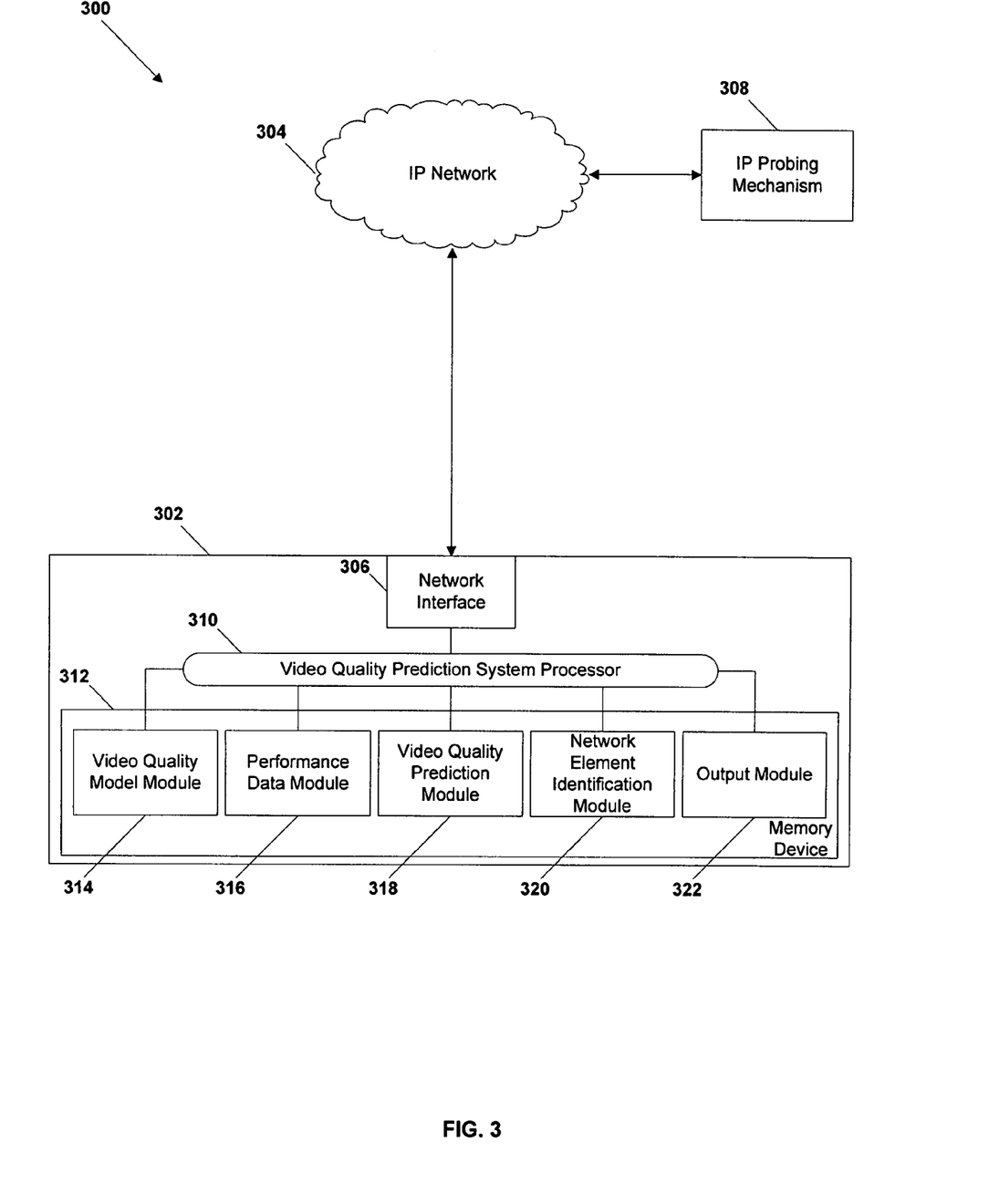
FIG. 3 is a block diagram illustrating a third particular illustrative embodiment of a system to manage video content quality.

FIG. 3 is a block diagram illustrating a third particular illustrative embodiment of a system 300 to manage video content quality. The system 300 includes a video quality prediction system 302 that communicates with an Internet Protocol (IP) network 304. In a particular embodiment, the video quality prediction system 302 may communicate with an IP probing mechanism 308 via the IP network 304.

The video quality prediction system 302 includes a video quality prediction system processor 310 and a memory device 312 accessible to the video quality prediction system processor 310. The video quality prediction system processor 310 can be coupled to a network interface 306 that communicates with the IP network 304.

In a particular embodiment, the video quality prediction system 302 may include a video quality model module 314 that is executable by the video quality prediction system processor 310 to develop a video quality model based on empirical performance testing data received from a video performance testing system. In an illustrative embodiment, the video quality model module 314 may be executable by the video quality prediction system processor 310 to develop the video quality model by relating a plurality of network performance metrics to video content quality. For example, video content may be produced according to a specified amount of packet loss, delay, jitter, dropped frames, or any combination thereof, and the video content quality can be correlated to the specified network performance metrics. In a specific example, a certain amount of packet loss may correlate with a video quality measurement of 8 on a scale of 1 to 10. In an illustrative, non-limiting embodiment, the empirical video performance testing data can include data to account for error concealing mechanisms, such as forward error correction (FEC), a retransmission based packet loss recover mechanism, such as R-UDP, or any combination thereof.

In a particular embodiment, the video quality model module 314 may be executable by the video quality prediction system processor 310 to adjust the video quality model based on video quality data received from field deployed set-top box devices. In an illustrative embodiment, each field subscriber associated with a particular field deployed set-top box device may enter video quality measurements via their corresponding field deployed set-top box device. In an illustrative, non-limiting embodiment, the video quality measurements may be entered at particular time intervals, if the video content quality degrades to a particular level, or any combination thereof.

In a particular embodiment, the video quality model module 314 may be executable by the video quality prediction system processor 310 to correlate the network performance metrics of a network path including a particular field deployed set-top box device with the subjective video quality measurements associated with the particular field deployed set-top box device. In an illustrative embodiment, the video quality module 314 may be executable by the video quality prediction system processor 310 to determine if the video quality model accurately predicts video content quality based on the video quality data entered at the field deployed set-top box devices and the corresponding network performance metrics at the time the video quality data was entered. If the video quality model does not accurately predict the video content quality, then the video quality module 314 may be executable by the video quality prediction system processor 310 to adjust the video quality model to more accurately correlate network performance metrics with video quality at set-top box devices along one or more network paths.

In a particular embodiment, the video quality prediction system 302 can include a performance data module 316 that is executable by the video quality prediction system processor 310 to receive performance data regarding a plurality of network elements of a network path linking a video head-end with one or more set-top box devices. In an illustrative, non-limiting embodiment, performance data may be collected from all of the network elements except the set-top box device(s) in order to evaluate video content quality without adjustments by error concealing mechanisms at the set-top box device(s), such as FEC, R-UDP, other error correction mechanisms, or any combination thereof.

In an illustrative embodiment, the performance data may relate to at least some of the network performance metrics of the video quality model developed by the video quality model module 314. In an illustrative, non-limiting embodiment, the performance data module 316 may be executable by the video quality prediction system processor 310 to convert the performance data to network performance metrics. For example, code violation, error seconds, and severe error seconds received from a DSLAM can be used to derive a packet loss metric related to a VDSL loop.

In a particular embodiment, the performance data may be received at the video quality prediction system 302 from an element management system, from the network elements of the network path, from the probing mechanism 308, or any combination thereof. In an illustrative embodiment, the performance data module 316 may be executable by the video quality prediction system processor 310 to query the element management system, the network elements, the IP probing mechanism 308, or any combination thereof for performance data.

In an illustrative embodiment, the performance data may be collected at various time intervals. For example, the performance data may be sent to the video quality prediction system 302 daily, hourly, after a certain number of minutes, such as every fifteen minutes, or any combination thereof. As a specific example, performance data may be sent to the video quality prediction system 302 after one hour or fifteen minute time intervals with five minute peaks, according to a desired level of detail.

In an illustrative embodiment, the IP probing mechanism 308 may be positioned as a stand-alone device along the network path and may be adapted to collect performance data from all of the network elements at a particular point along the network path. Alternatively, the IP probing mechanism 308 may be coupled to a particular network element of the network path and may be adapted to collect performance data from the particular network element. In an illustrative, non-limiting embodiment, the IP probing mechanism 308 may be an active probing device, a passive probing device, or any combination thereof. Further, the IP probing mechanism 308 may be unicast based or multicast based.

In a particular embodiment, the video quality prediction system 302 may include a video quality prediction module 318 executable by the video quality prediction system processor 310 to predict a quality of video content received at a set-top box device of the network path. In an illustrative embodiment, the video quality prediction module 318 may be executable by the video quality prediction system processor 310 to apply the video quality model developed via the video quality model module 314 to the performance data received from the network elements, the IP probing mechanism 308, an element management system, or any combination thereof. For example, the video quality model may be applied to performance data, or network performance metrics derived therefrom, to predict the video content quality at a particular set-top box device communicating with the network elements.

In a particular embodiment, the video quality prediction module 318 may be executable by the video quality prediction system processor 310 to determine whether the predicted quality of video content is greater than or equal to a video quality threshold. In an illustrative, non-limiting embodiment, the video quality threshold may represent a certain degree of degradation in video content quality that can be perceived by one viewing the video content.

In a particular embodiment, the video quality prediction system 302 can include a network element identification module 320 executable by the video quality prediction system processor 310 to identify at least one of the plurality of network elements not satisfying a performance requirement, based on the performance data, when the predicted quality of video content is less than the video quality threshold. In an illustrative embodiment, the network element identification module 320 may be executable by the video quality prediction system processor 310 to analyze the performance data associated with each network element of the network path and to determine which network elements are not satisfying specified performance requirements. For example, the performance data may point to a buffer overflow at a particular network element, indicating packet delay or jitter, that may be contributing to the degradation of video content quality below the video quality threshold.

In a particular embodiment, the video quality prediction system 302 can include an output module 322 executable by the video quality prediction system processor 310 to output data indicating the network element(s) not satisfying the performance requirement(s) when the predicted quality of video content is less than the video quality threshold. For example, the output module 322 may be executable by the video quality prediction system processor 310 to send data to a technician, an error log in communication with a network server, or both, indicating that a particular network element is not meeting its performance requirement. In a specific example, the output module 322 may be executable by the video quality prediction system processor 310 to send data to a technician indicating the need to isolate a network element not satisfying a performance requirement and to re-route video content via other network elements.

For ease of explanation, the various modules 314, 316, 318, 320, and 322 have been described in terms of processor-executable instructions. However, those skilled in the art will appreciate that such modules can be implemented as hardware logic, processor-executable instructions, or any combination thereof.

Figure 4:
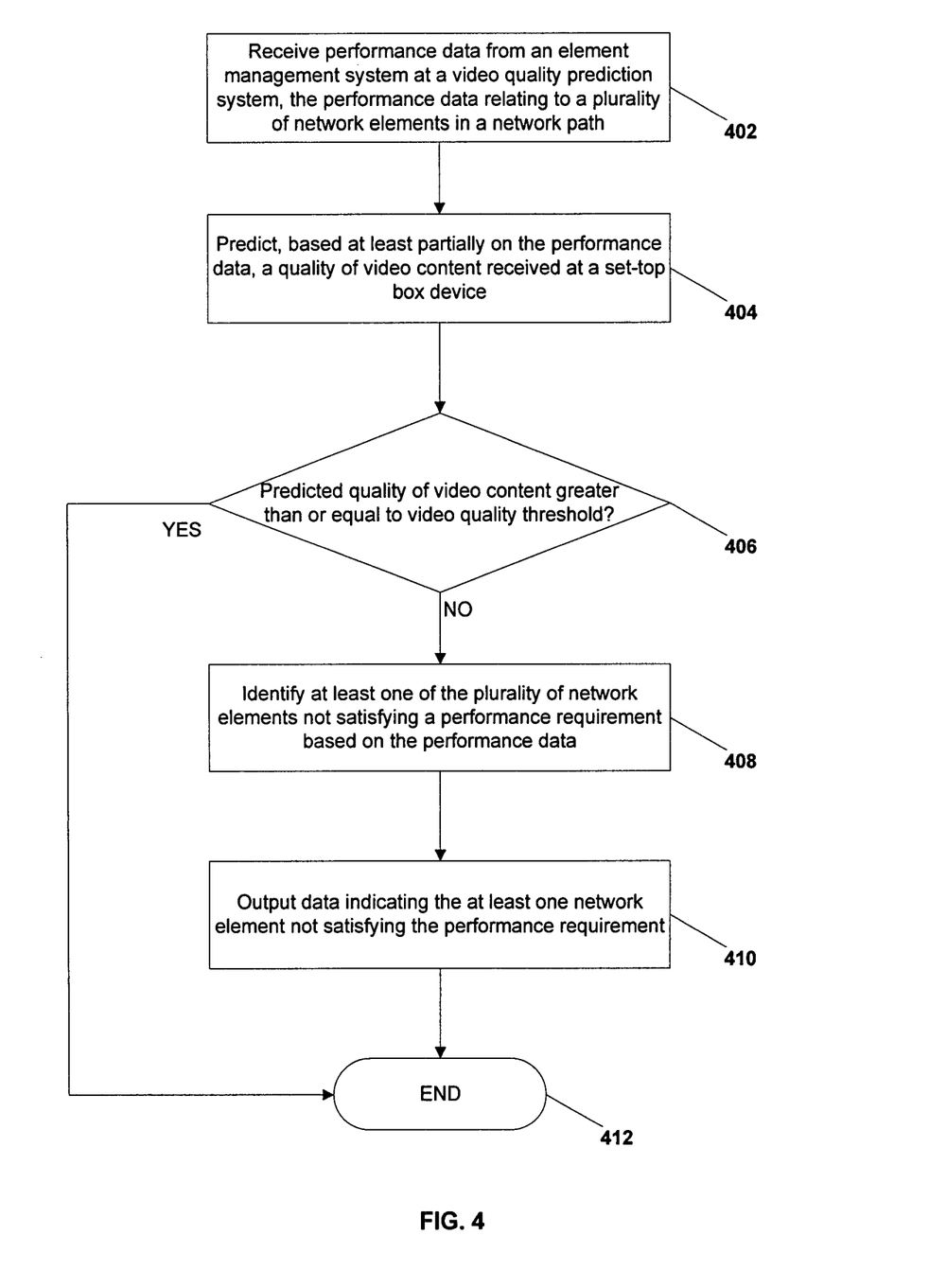
FIG. 4 is a flow diagram of a particular illustrative embodiment of a method of managing video content quality.

FIG. 4 is a flow diagram of a particular illustrative embodiment of a method of managing video content quality. At block 402, a video quality prediction system receives performance data from an element management system. In a particular embodiment, the performance data relates to a plurality of network elements in a network path, such as a video head-end, a central office, an inter-nodal office, a service area interface, a residential gateway, network links, other network elements, or any combination thereof. Proceeding to block 404, the video quality prediction system predicts a quality of video content received at a set-top box device along the network path based at least partially on the performance data.

Moving to decision node 406, the video quality prediction system determines whether the predicted quality of video content is greater than or equal to a video quality threshold. If the video quality prediction system determines that the predicted quality of video content is indeed greater than or equal to a video quality threshold, then the method terminates at 412. On the other hand, if the video quality prediction system determines that the predicted quality of video content is less than the video quality threshold, then the method proceeds to block 408. At block 408, the video quality prediction system identifies at least one of the plurality of network elements not satisfying a performance requirement. For example, one of the network elements may be experiencing a buffer overflow due to packet delay or experiencing a specified amount of packet loss. Moving to block 410, the video quality prediction system outputs data identifying the network element(s) not satisfying the performance requirement(s). For example, the video quality prediction system may send data to a technician or network management entity indicating a need to re-route video content around the network elements not satisfying the performance requirement. The method terminates at 412.

Figure 5:
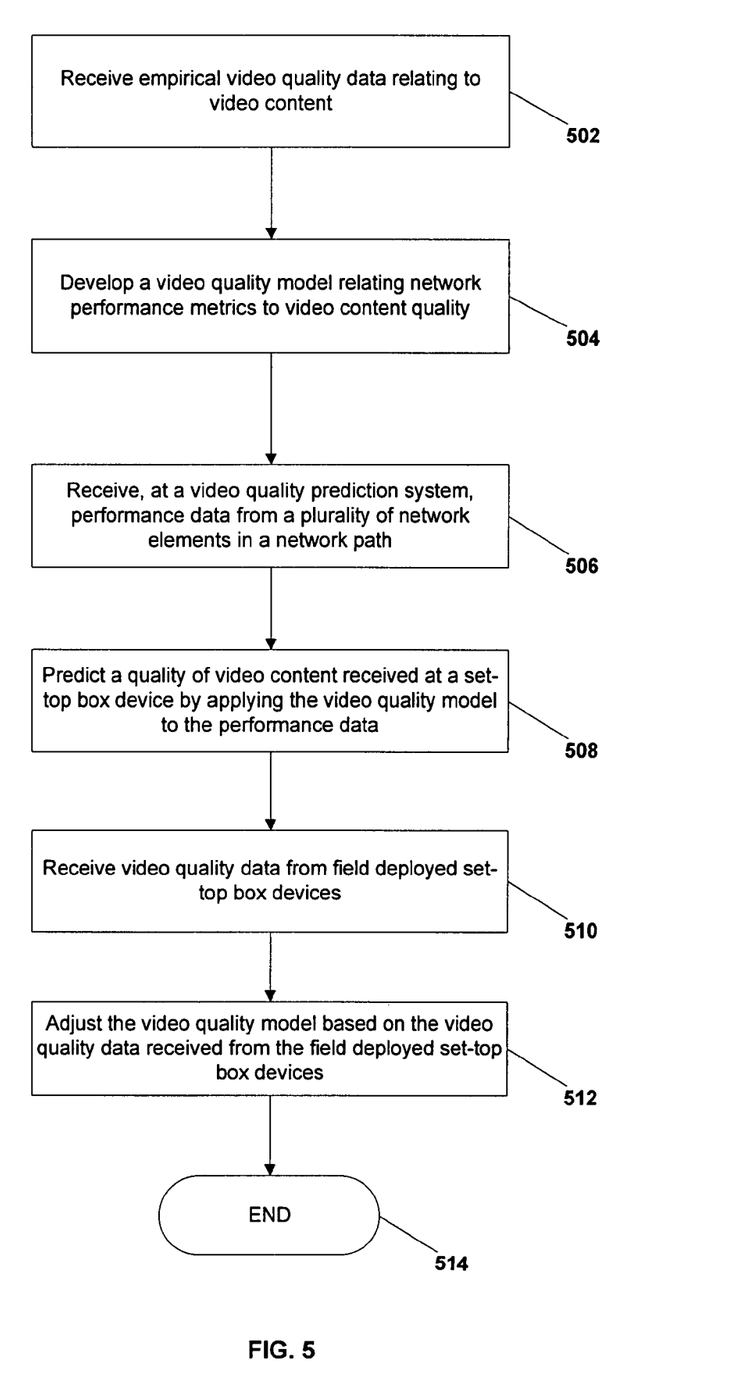
FIG. 5 is a flow diagram of a second particular illustrative embodiment of a method of managing video content quality.

FIG. 5 is a flow diagram of a second particular illustrative embodiment of a method of managing video content quality. At block 502, in a particular embodiment, a video quality prediction system receives empirical video quality data relating to video content from a video performance testing system. Proceeding to block 504, the video quality prediction system develops a video quality model that relates network performance metrics to video content quality. For example, in the video quality model, the delay occurring along a network path may correlate with a certain degree of degradation in video content quality.

Moving to block 506, the video quality prediction system receives performance data from a plurality of network elements of the network path. At block 508, the video quality prediction system predicts a quality of video content received at a set-top box device associated with the network path by applying the video quality model to the performance data.

Proceeding to block 510, in a particular embodiment, the video quality prediction system receives video quality data from field deployed set-top box devices. At block 512, the video quality prediction system adjusts the video quality model based on the video quality data received from the field deployed set-top box devices. For example, the video quality prediction system may adjust the video quality model to correct discrepancies between the predicted video content quality and the video quality data received from the field deployed set-top box devices. The method terminates at 514.

Figure 6:
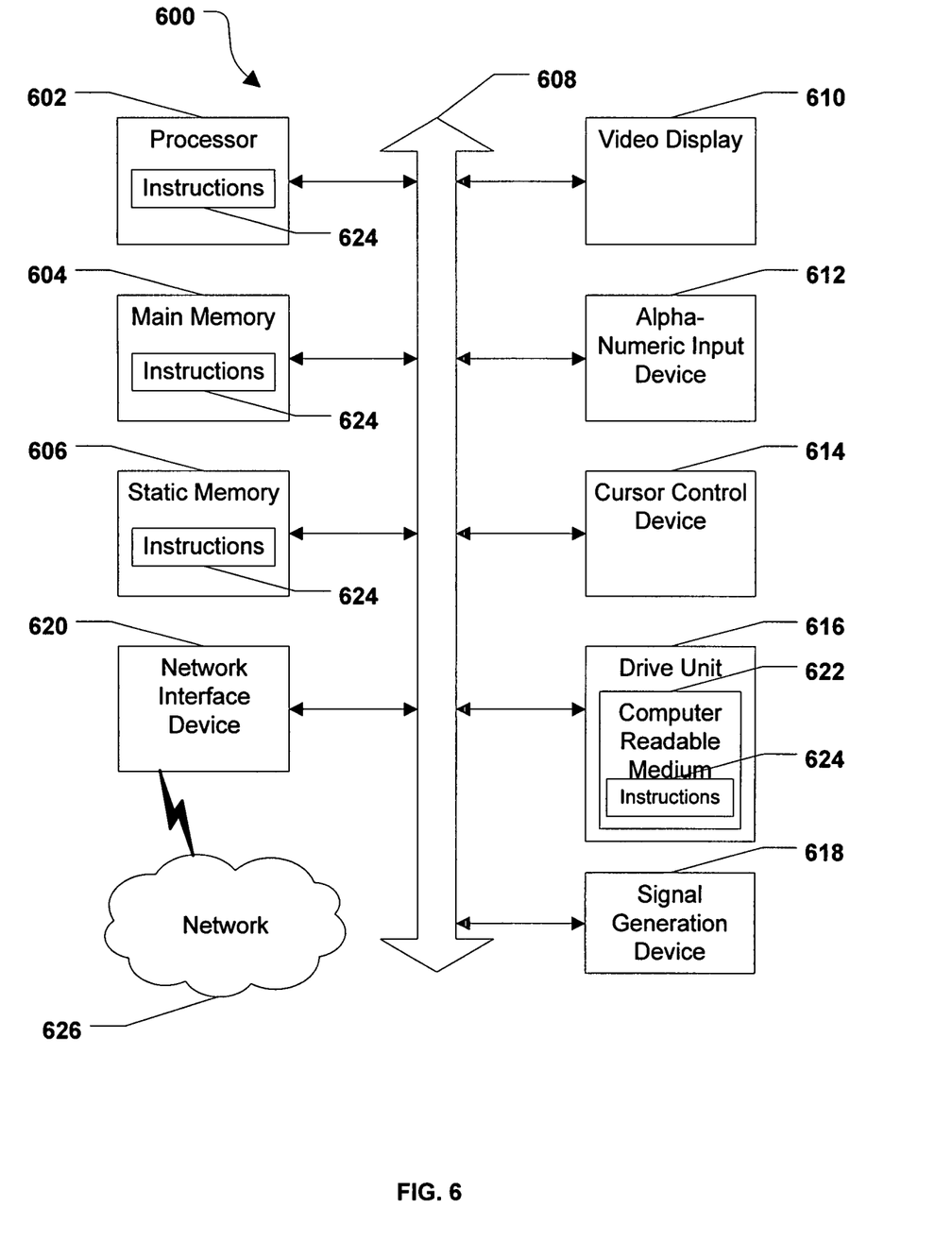
FIG. 6 is a block diagram of an illustrative embodiment of a general computer system.

FIG. 6 is a block diagram of an illustrative embodiment of a general computer system 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including the network elements or servers, as shown in FIGS. 1-3.

In a networked deployment, the computer system may operate in the capacity of a video quality prediction system or one or more network elements of a video distribution network, as illustrated in FIGS. 1-3. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile)

memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R.§1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing video content quality, the method comprising:
    receiving video performance testing data at a video quality prediction system from a testing system, wherein the testing system varies values of a plurality of network performance metrics during a testing time period to obtain the video performance testing data, and wherein the video performance testing data includes video quality measurements received by a field deployed set-top box device during the testing time period;
    determining a video quality model based on the video performance testing data at the video quality prediction system;
    receiving network characteristic data at the video quality prediction system, the network characteristic data collected from a plurality of network elements, wherein the plurality of network elements is included in a network that links a video head-end with a particular set-top box device;
    applying, at the video quality prediction system, the network characteristic data with the video quality model to determine a predicted quality of video content to be delivered to the particular set-top box device; and
    in response to the predicted quality of video content being less than a threshold:
        identifying, at the video quality prediction system, a particular network element of the plurality of network elements that fails to satisfy a network element threshold, wherein an identification of the particular network element is based on the network characteristic data; and
        outputting data identifying the particular network element from the video quality prediction system.

2. The method of claim 1, further comprising correlating the network characteristic data with a subjective video quality measurement associated with the particular set-top box device.

3. The method of claim 2, further comprising:
    determining an accuracy of the predicted quality of the video content based on the subjective video quality measurement associated with the particular set-top box device and correlated network characteristic data at a time when the subjective video quality measurement was received, the subjective video quality measurement entered by a subscriber at the particular set-top box device; and
    in response to the predicted quality of the video content being inaccurate with reference to the subjective video quality measurement associated with the particular set-top box device, adjusting the video quality model to correlate the network characteristic data with the subjective video quality measurement associated with the particular set-top box device.

4. The method of claim 1, wherein the plurality of network elements includes a video head-end office, a central office, an inter-nodal office, a service area interface, a central office terminal, an access device, an aggregation device, an internet protocol switch, an internet protocol router, a multiplexer, a network edge device, a digital subscriber line access multiplexer, an optical network terminal, an optical line terminal, an optical network unit, a home phone line network adaptor, a very high-speed digital subscriber line loop, a fiber optic line, or any combination thereof.

5. The method of claim 1, wherein the network characteristic data includes performance data including at least one of a delay metric, a jitter metric, a packet loss ratio, a packet loss distance, a packet loss period, an unrecovered packet loss metric, a dropped frames metric, a forward error correction metric, a retransmission-based packet loss recovery metric, a reliable user datagram protocol, or any combination thereof.

6. The method of claim 1, wherein the network characteristic data includes data related to forward error correction, a retransmission based packet loss recover mechanism, or any combination thereof.

7. The method of claim 1, further comprising adjusting the video quality model based on additional video quality data received from a plurality of field deployed set-top box devices.

8. The method of claim 1, wherein the video quality prediction system receives the network characteristic data from an element management system, the network characteristic data including a service queue statistic, a number of packet drops, a queue length, network element control plane warning information, an internet group multicast protocol join warning, an internet group multicast protocol leave warning, a detected network link failure, a border gateway protocol re-converge event, an open shortest path first re-converge event, a multi-protocol label switching re-converge event, a network link length, a distance between two or more of the plurality of network elements, an active probing performance result between two or more of the plurality of network elements, or any combination thereof.

9. The method of claim 8, wherein the particular set-top box device is coupled to a data storage device that communicates with the video quality prediction system via the element management system.

10. The method of claim 1, wherein the video quality prediction system receives the network characteristic data from each network element of a network path.

11. The method of claim 1, wherein the data identifying the particular network element indicates a need to re-route video content around the particular network element.

12. A system comprising:
a memory; and
a processor coupled to the memory and adapted to perform operations including:
receiving video performance testing data from a testing system, wherein the testing system varies values of a plurality of network performance metrics during a testing time period to obtain the video performance testing data, and wherein the video performance testing data includes video quality measurements received by a field deployed set-top box device during the testing time period;
determining a video quality model based on the video performance testing data;
receiving network characteristic data related to a plurality of network elements, wherein the plurality of network elements are included in a network that links a video head-end with a particular set-top box device;
applying the network characteristic data with the video quality model to determine a predicted quality of video content to be delivered to the particular set-top box device; and
in response to the predicted quality of video content being less than a threshold:
identifying a particular network element of the plurality of network elements that fails to satisfy a network element threshold, wherein an identification of the particular network element is based on the network characteristic data; and
outputting data identifying the particular network element.

13. The system of claim 12, wherein the plurality of network performance metrics includes delay, jitter, packet loss ratio, packet loss distance, packet loss period, unrecovered packet loss, dropped intracoded frames, dropped bi-predictive frames, dropped predictive coded frames, or any combination thereof.

14. The system of claim 12, wherein the video quality measurements are based on user input data received at the field deployed set-top box device during the testing time period.

15. The system of claim 12, wherein the operations further include receiving the network characteristic data from a probing mechanism located along a network path.

16. The system of claim 15, wherein network characteristic data for the particular network element is received from the probing mechanism.

17. The system of claim 15, wherein the probing mechanism is an active probing device, a passive probing device, or any combination thereof.

18. The system of claim 12, wherein the plurality of network elements includes a super head-end, a regional head-end, a national head-end, an inter-nodal office, a central office, a serving area interface, a router, a switch, a residential gateway, a video distribution hub, a network edge device, an optical network terminal, an optical line terminal, an optical network unit, a home phone line network adaptor, a fiber optic line, a very high-speed digital subscriber line loop, a home network phone line, or any combination thereof.

19. The system of claim 13, wherein the plurality of network performance metrics are related to the network characteristic data.

20. The system of claim 15, wherein the network path includes a very high-speed digital subscriber line loop and wherein the network characteristic data includes performance data including code violations, error seconds, severe error seconds, or any combination thereof.

21. The system of claim 12, wherein the network includes an Ethernet layer and the network characteristic data includes performance data including performance counters, the performance counters including a count of Ethernet frame cyclic redundancy checks, a count of Ethernet frames dropped, or any combination thereof.

22. A processor-readable storage device comprising instructions that when executed by a processor, cause the processor to perform operations including:
receiving video performance testing data from a testing system, wherein the testing system varies values of a plurality of network performance metrics during a testing time period to obtain the video performance testing data, and wherein the video performance testing data includes video quality measurements received by a field deployed set-top box device during the testing time period;
determining a video quality model based on the video performance testing data;
receiving network characteristic data regarding a plurality of network elements, wherein the plurality of network elements are included in a network that links a video head-end with a particular set-top box device;

applying the network characteristic data with the video quality model to determine a predicted quality of video content to be delivered to the particular set-top box device; and in response to the predicted quality of video content being less than a threshold:

identifying a particular network element of the plurality of network elements that fails to satisfy a network element threshold, wherein an identification of the particular network element is based on the network characteristic data; and outputting data identifying the particular network element.

23. The processor-readable storage device of claim 22, wherein the network characteristic data is received from an element management system.

24. The processor-readable storage device of claim 23, wherein the operations further include adjusting the video quality model based on additional video quality data received from a plurality of field deployed set-top box devices.

25. The processor-readable storage device of claim 22, wherein the operations further include querying the network elements for the network characteristic data.

26. The processor-readable storage device of claim 22, wherein the operations further include querying a probing mechanism located along a network path.

27. The processor-readable storage device of claim 26, wherein the probing mechanism is unicast based.

28. The processor-readable storage device of claim 26, wherein the probing mechanism is multicast based.

* * * * *